(12) United States Patent
Wang

(10) Patent No.: US 9,189,976 B2
(45) Date of Patent: Nov. 17, 2015

(54) NAVIGATION SYSTEM WITH MULTI-LAYER ROAD CAPABILITY MECHANISM AND METHOD OF OPERATION THEREOF

(71) Applicant: Telenav, Inc., Sunnyvale, CA (US)

(72) Inventor: Zhou Wang, Shanghai (CN)

(73) Assignee: TELENAV INC., Sunnyvale, CA (US)

( * ) Notice: Subject to any disclaimer, the term of this patent is extended or adjusted under 35 U.S.C. 154(b) by 56 days.

(21) Appl. No.: 13/938,908

(22) Filed: Jul. 10, 2013

(65) Prior Publication Data

US 2015/0019122 A1  Jan. 15, 2015

(51) Int. Cl.
*G01C 21/16* (2006.01)
*G09B 29/10* (2006.01)
*G01C 21/20* (2006.01)

(52) U.S. Cl.
CPC .............. *G09B 29/106* (2013.01); *G01C 21/20* (2013.01)

(58) Field of Classification Search
None
See application file for complete search history.

(56) References Cited

U.S. PATENT DOCUMENTS

| 6,115,668 | A * | 9/2000 | Kaneko et al. ................. 701/454 |
| 6,385,540 | B1 | 5/2002 | Ajima |
| 6,604,048 | B2 * | 8/2003 | Ishida et al. .................. 701/469 |
| 6,865,485 | B2 | 3/2005 | Jun |
| 7,167,795 | B2 * | 1/2007 | Hirose et al. .................. 701/423 |
| 7,398,155 | B2 * | 7/2008 | Ichida ........................... 701/457 |
| 7,480,565 | B2 * | 1/2009 | Ikeuchi et al. ................ 701/410 |
| 8,612,136 | B2 * | 12/2013 | Levine et al. ................. 701/408 |
| 2005/0027448 | A1 * | 2/2005 | Takenaga et al. ............. 701/211 |
| 2005/0131641 | A1 * | 6/2005 | Beesley et al. ............... 701/209 |
| 2006/0217879 | A1 * | 9/2006 | Ikeuchi et al. ................ 701/208 |
| 2007/0276600 | A1 * | 11/2007 | King et al. .................... 701/301 |
| 2008/0021632 | A1 * | 1/2008 | Amano ......................... 701/117 |
| 2011/0060521 | A1 * | 3/2011 | Watkins ........................ 701/213 |
| 2011/0196607 | A1 * | 8/2011 | Tsai et al. ..................... 701/207 |
| 2011/0298603 | A1 * | 12/2011 | King et al. .................... 340/436 |
| 2013/0085664 | A1 * | 4/2013 | Park et al. ..................... 701/411 |
| 2013/0096822 | A1 * | 4/2013 | Sempuku et al. ............. 701/428 |
| 2014/0157893 | A1 * | 6/2014 | Matsuzawa et al. ............ 73/384 |
| 2014/0311241 | A1 * | 10/2014 | Kitano ............................ 73/384 |

* cited by examiner

*Primary Examiner* — Thomas Tarcza
*Assistant Examiner* — Richard Goldman
(74) *Attorney, Agent, or Firm* — IP Investment Law Group

(57) ABSTRACT

A method of operation of a navigation system includes: detecting a current location for locating a vehicle; determining a road type as multi-layered at the current location for identifying a multi-layer road structure; calculating a first average speed outside an intersection location; calculating a second average speed at the intersection location; determining a difference speed between the first average speed and the second average speed; and determining a road layer location from the difference speed for locating the current location along the multi-layer road structure for displaying on a device.

14 Claims, 9 Drawing Sheets

NAVIGATION SYSTEM WITH MULTI-LAYER ROAD CAPABILITY MECHANISM AND METHOD OF OPERATION THEREOF

TECHNICAL FIELD

The present invention relates generally to a navigation system, and more particularly to a system for determining movement and altitude information.

BACKGROUND ART

Modern portable consumer and industrial electronics, especially client devices such as navigation systems, cellular phones, portable digital assistants, and combination devices are providing increasing levels of functionality to support modern life including location-based information services. Research and development in providing location-based technologies on a wide range of portable and mobile devices can take a myriad of different directions.

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information. At the same time, road systems around the world have become more complex, with surface, elevated, or underground road systems to ease traffic congestion on surface roads.

Thus, a need still remains for a navigation system with multi-layer road capability that provides information on whether a navigation system is located on a surface road or one of the layers in a multi-layer road structure. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

BRIEF SUMMARY OF THE INVENTION

The present invention provides a method of operation of a navigation system including: detecting a current location for locating a vehicle; determining a road type as multi-layered at the current location for identifying a multi-layer road structure; calculating a first average speed outside an intersection location; calculating a second average speed at the intersection location; determining a difference speed between the first average speed and the second average speed; and determining a road layer location from the difference speed for locating the current location along the multi-layer road structure for displaying on a device.

The present invention provides a navigation system, including: a location module for detecting a current location for locating a vehicle; a matching module, coupled to the location module, for determining a road type at the current location; a speed differential module, coupled to the matching module, for determining a first average speed outside an intersection location and a second average speed at the intersection location, and for determining a difference speed between the first average speed and the second average speed; and a comparator module, coupled to the speed differential module, for determining a road layer location from the difference speed for locating the vehicle along a multi-layer road structure.

Certain embodiments of the invention have other steps or elements in addition to or in place of those mentioned above. The steps or element will become apparent to those skilled in the art from a reading of the following detailed description when taken with reference to the accompanying drawings.

DETAILED DESCRIPTION

Figure 1:
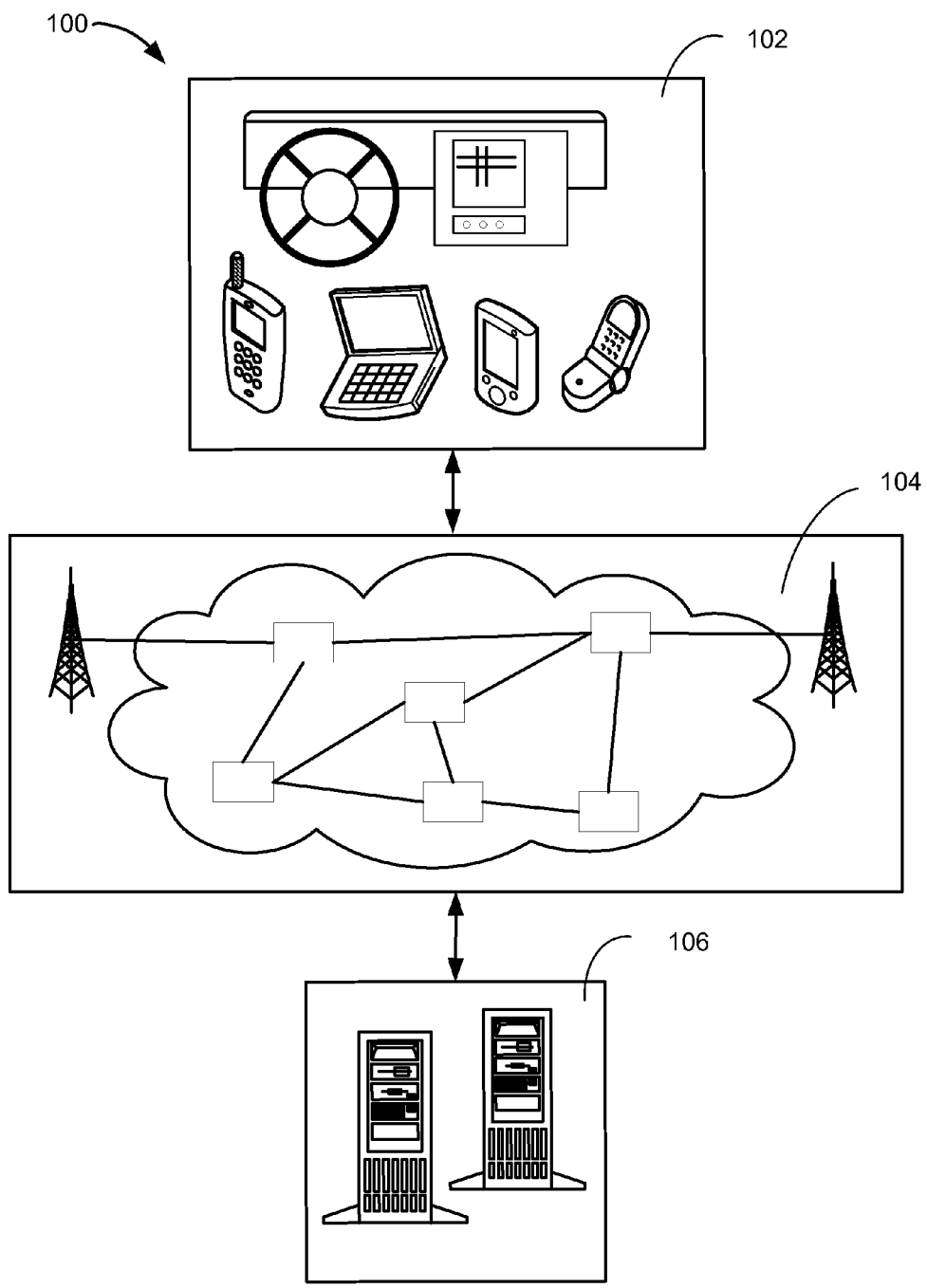
FIG. 1 is a navigation system with a multi-layer road structure identification mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of operations, types of businesses, advertised specials, traffic information, maps, local events, and nearby community or personal information.

The term "module" referred to herein refers to software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "map attribute" referred to herein can include road properties, such as number of lanes, direction of traffic flow, x-y location, number of traffic lights, speed cameras, stop signs, number of intersections, and altitude position.

Referring now to FIG. 1, therein is shown a navigation system 100 with a multi-layer road structure identification mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
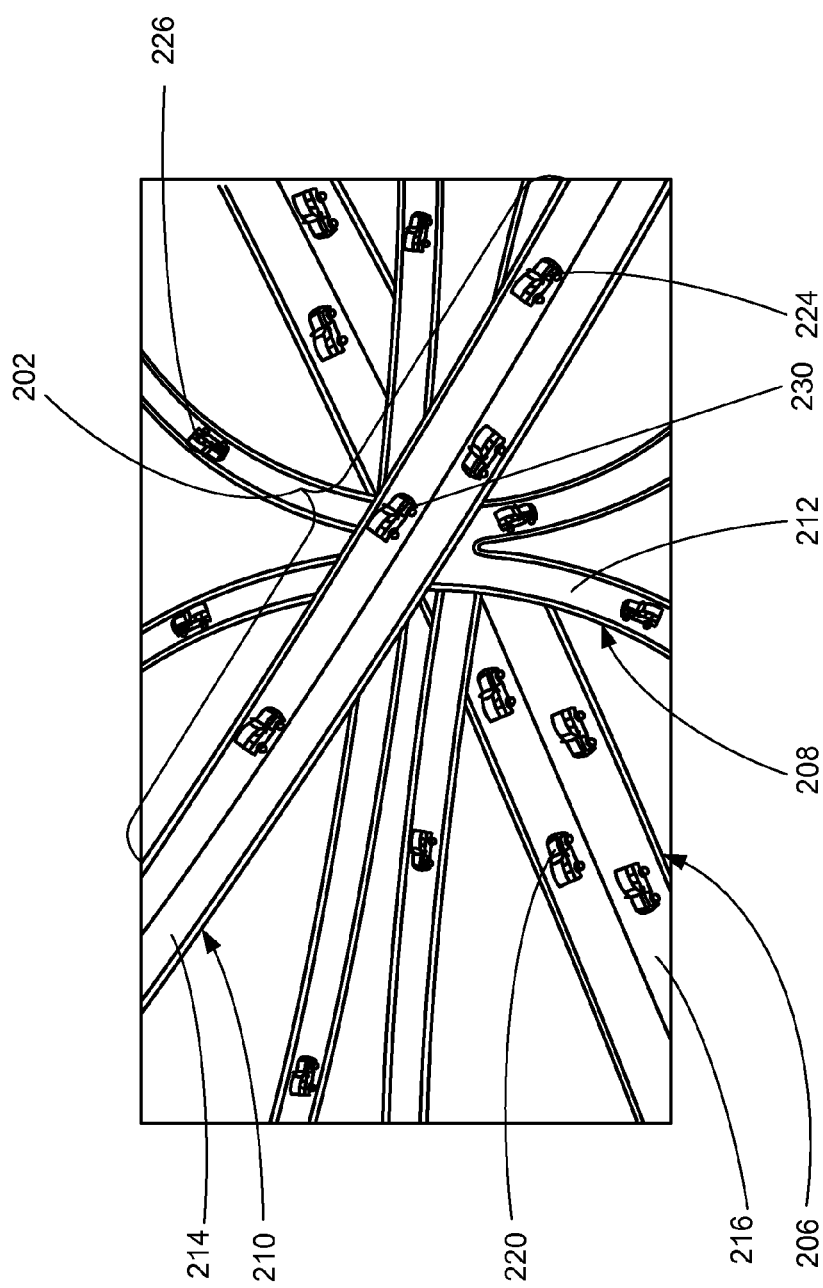
FIG. 2 shows a first example of a multi-layer road structure identification shown on a display of the navigation system.

Referring now to FIG. 2, therein is shown a first example of a multi-layer road structure 202 shown on a display of the navigation system 100. In this example, the figure depicts the multi-layer road structure 202. The multi-layer road structure 202 can include a first road layer 206 at a first altitude 216, and a first layer location 220 on the first road layer 206.

The multi-layer road structure 202 can include a second road layer 208 at a second altitude 212, and a second layer location 226 on the second road layer 208. Furthermore, it can include a third road layer 210 at a third altitude 214, and a third layer location 224 on the third road layer 210. There are sections of roads with multiple layers that have the same longitude and latitude but have different altitudes. The traffic in each layer can be moving in a different direction. The first device 102 of the navigation system 100 can generate layer location or altitude information at a location 230 with multiple layers of roads. As an example, the display can be part of the first device 102 or the second device 106 of the navigation system 100.

Figure 3:
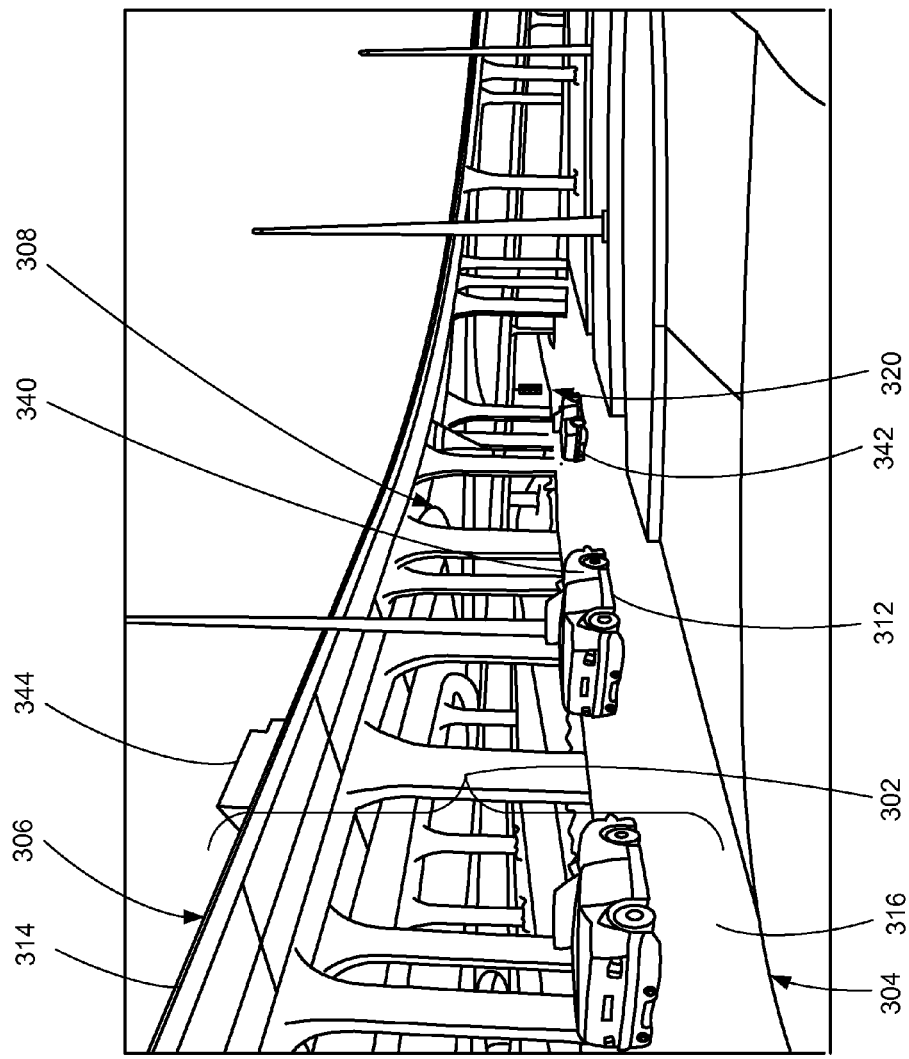
FIG. 3 shows a second example of a multi-layer road structure identification of a display of the navigation system.

Referring now to FIG. 3, therein is shown a second example of a multi-layer road structure identification of a display of the navigation system 100. FIG. 3, for example, can depict a road type 302 on a display of the first device 102 of the navigation system 100. In this example, the figure depicts the road type 302 of a dual-layer road structure with a surface layer road 304 going in a first direction 316 and a first elevated layer road 306 going in a similar direction 314 or generally in a similar direction.

The figure also depicts a second elevated layer road 308 going in a different direction different from the first elevated layer road 306. In this example, a vehicle 340 at a current location 312 with the first device 102 of the navigation system 100 is on the surface layer road 304. The surface layer road 304 has an intersection 320 with traffic lights and lower speed limits. A vehicle 342 at the intersection 320 can be moving slower, as compared to the vehicle 340 outside an intersection or a vehicle 344 on the first elevated layer road 306 which does not have an intersection with traffic lights, and traffic can move faster. The navigation system 100 can generate layer location or altitude information of the first device 102 of the navigation system 100.

Figure 4:
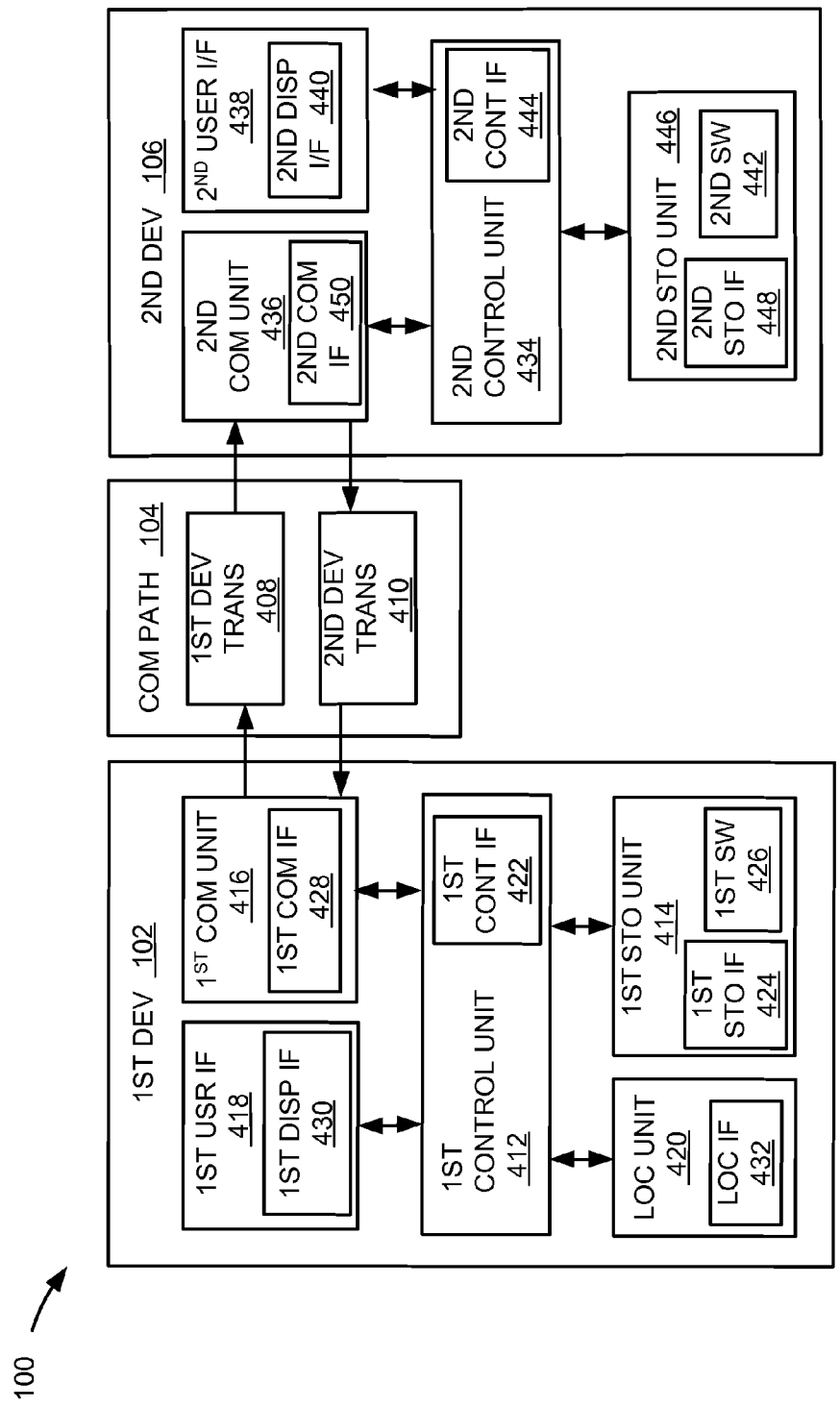
FIG. 4 shows an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first device 102 can be similarly described by the first device 102.

The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations external to the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
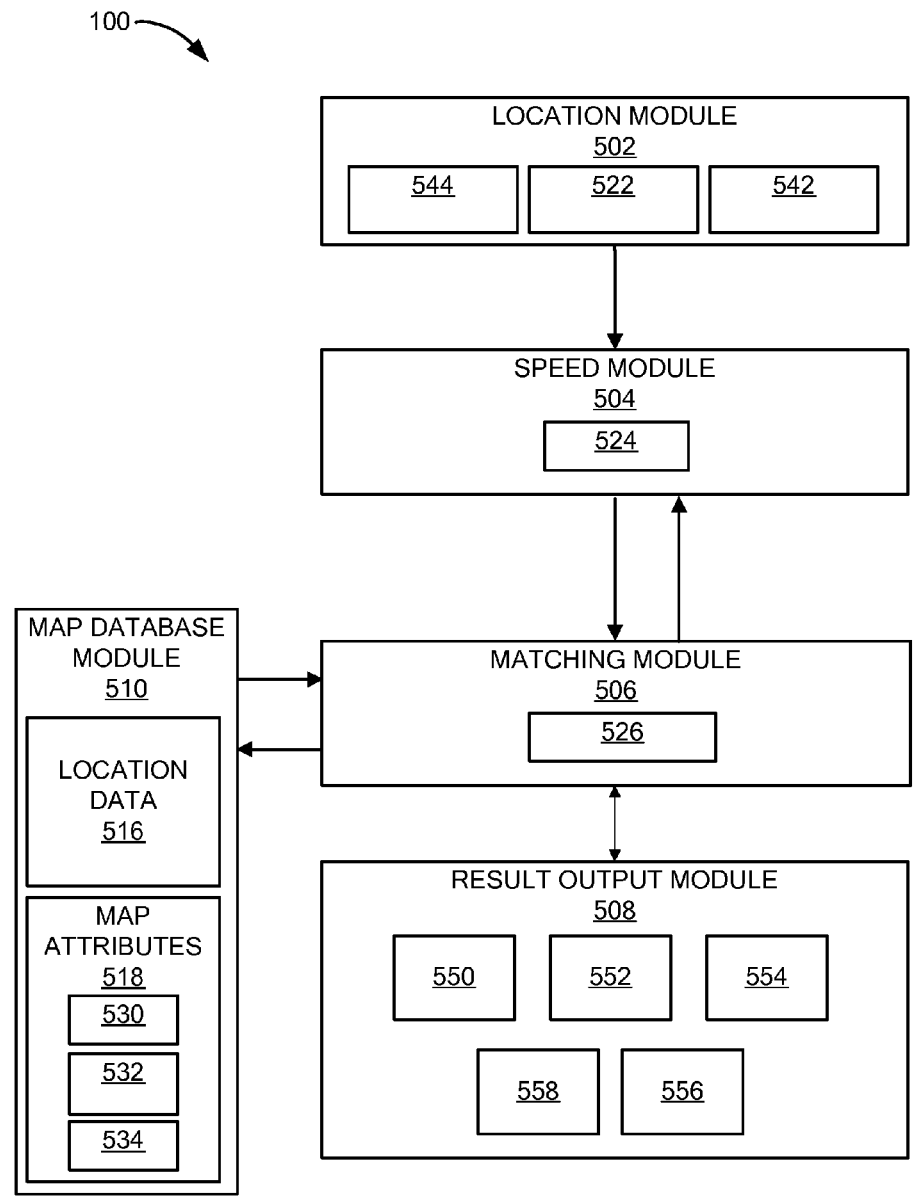
FIG. 5 shows a control flow of the navigation system.

Referring now to FIG. 5, therein is shown a control flow of the navigation system 100. The control flow can also be implemented in the first device 102 of FIG. 1 or the second device 106 of FIG. 1. The first device 102 of the navigation system 100 can include a location module 502, which detects a current location 522 and provides a location reading for the first device 102. The purpose of the location module 502 is to perform the location read operation. The location read operation can be performed utilizing the global positioning system (GPS), cellular triangulation, dead reckoning with accelerometer, or a combination thereof, as examples. The location module 502 provides location coordinates 542 of the first device 102 for locating a vehicle 544. The location module 502 is coupled to a speed module 504.

The purpose of the speed module 504 is to read, calculate, and determine the speed of the first device 102 of the navigation system 100. The speed module 504 can measure and calculate a system speed 524 over time based on location changes. The speed module 504 can read the speed from a system bus of a vehicle. Alternatively, the speed module 504 can locate the vehicle at certain points in time, determine the distance traveled during those points in time, and calculate an average system speed. The speed module 504 can also read, calculate, and determine the speed of the first device 102 of the navigation system 100 at the first layer location 220 or the second layer location 226, and the third layer location 224 in FIG. 2 at certain time intervals. The speed module 504 is coupled to a matching module 506. The matching module 506 is coupled to a map database module 510 and a result output module 508.

The purpose of the matching module 506 is to map geographical locations of the first device 102 of the navigation system 100 (including the navigational location information) onto map attributes 518 of the location coordinates 542 in the map database module 510. The matching module 506 performs an attribute look-up 526 in the map database module 510 to identify the map attributes 518 of the current location 522.

The purpose of the map database module 510 is to provide location data 516 and the map attributes 518, including whether a road is the multi-layer road structure 202. The map database module 510 can provide the location data 516, the map attributes 518 such as a road altitude 530 based on the current location 522 and whether the location is situated on an upper or a lower layer information 532 of the multi-layer road structure 202. The map attributes 518 and an intersection location 534 can be input into the matching module 506. The matching module 506 can read, calculate, and detect location from the location module 502 to determine if the first device 102 of the navigation system 100 is on the multi-layer road structure 202.

The matching module 506 can identify the map attributes 518, such as a road layer location 550 on which the first device 102 is located and a device altitude 552. The result output module 508 can provide the road layer location 550, the device altitude 552, road type 558 as well as further navigation assistance 554. The result output module 508 can also provide information on a display device 556.

Figure 6:
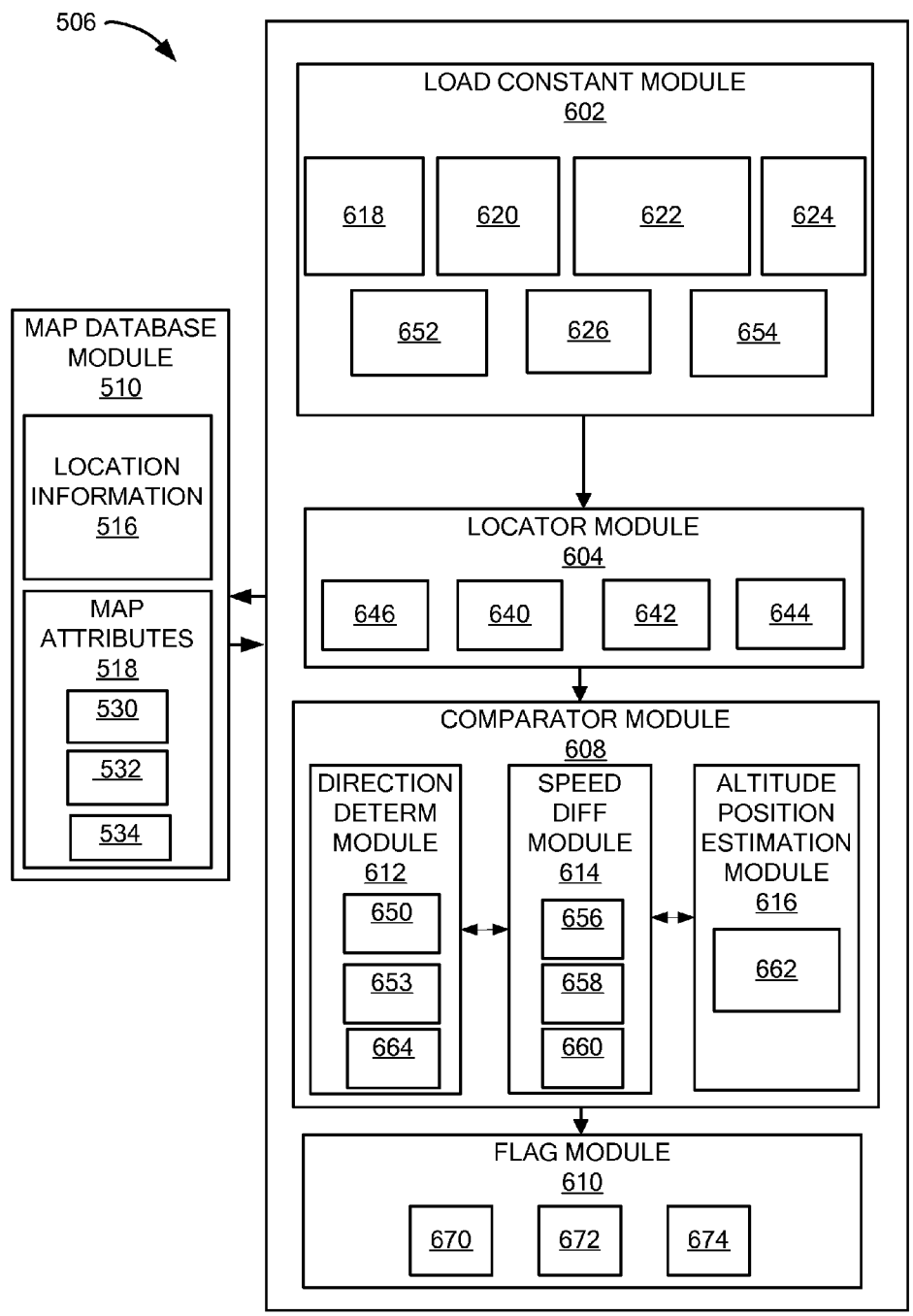
FIG. 6 shows a control flow of the matching module of the navigation system.

Referring now to FIG. 6, therein is shown a control flow of the matching module 506 of the navigation system 100. The matching module 506 can include a load constant module 602, a locator module 604, a comparator module 608, and a flag module 610. The load constant module 602 can be coupled to the locator module 604. The locator module 604 can be coupled to the comparator module 608, which can be coupled to the flag module 610.

The purpose of the load constant module 602 is to allow input and storage of constants 652 or other threshold values 654 into the first device 102 of the navigation system 100 from a user, the navigation system 100, a system connected to the navigation system 100, or a combination thereof. The constants 652 and the threshold values 654 in the load constant module 602 can include a speed change threshold 618 (Δspeed), a direction threshold 620 (Δroad), and an intersection threshold 622 (N_intersection). The load constant module 602 can also include real time traffic information 624 and empirical data 626.

The speed change threshold 618 is defined as a minimum speed change constant that should be detected before an analysis of whether a vehicle is on the multi-layer road structure 202 is performed. The speed change threshold 618 is determined by the map attributes 518, such as the speed limit of a road, or the accuracy or margin of error of the navigation system 100.

For example, if a difference speed 660 between a first average speed 656 outside an intersection location 640 and a second average speed 658 at the intersection location 640 is smaller than the accuracy of margin of error of the system, the analysis cannot produce a reliable result. A value for the speed change threshold 618 loaded into the load constant module 602 should be equal to or larger than the accuracy of the speed module 504 in measuring speed.

The direction threshold 620 is defined as a minimum difference constant in the direction between two layers of the multi-layer road structure 202. A value for the direction threshold 620 loaded into the load constant module 602 should be equal to or larger the accuracy of the first device 102 of the navigation system 100 in measuring a direction difference 664 or the location coordinates 542. The intersection threshold 622 is defined as a predetermined number of intersections that are detected before determining the first device 102 of the navigation system 100 is on a road layer with intersections or on a high-speed road layer without intersections.

An intersection can have traffic lights, stop signs or other traffic control mechanisms, such as a traffic officer or traffic signs. The constants 652 and the threshold values 654 in the load constant module 602 can be based on field testing, empirical traffic data, real time traffic information, road condition such as speed limit, and preset condition such as the accuracy of the navigation system 100.

The load constant module 602 can be coupled to the locator module 604. The purpose of the locator module 604 is to input a longitudinal information 642 and a latitude information 644 to provide a device location 646 of the first device 102 of the navigation system 100 on a map. The load constant module 602 can also store the intersection location 640 and a location outside the intersection location 640. For example, the locator module 604 can receive location information from GPS satellites. Also, for example, the locator module 604 can send and receive location information from cellular towers or WiFi networks. The locator module 604 can be coupled to the comparator module 608.

The purpose of the comparator module 608 is to match the location determined by the locator module 604 with the map attributes 518 in the map database module 510. The comparator module 608 can input the longitudinal information 642 and the latitude information 644 from the locator module 604 and read the corresponding the map attributes 518 from the map database module 510. The comparator module 608 checks the longitudinal information 642 and the latitude information 644, identifies the current location in the map database module 510, and determines if the location is situated in the multi-layer road structure 202.

The comparator module 608 can be coupled to the flag module 610. The comparator module 608 can include a direction determination module 612, a speed differential module 614, and an altitude position estimation module 616. The purpose of the altitude position estimation module 616 is to determine a system height or altitude information 662. The altitude position estimation module 616 can determine system height or the altitude information 662 from the road layer location 550 and perform the attribute look-up 526 to find the device altitude 552.

The purpose of the direction determination module 612 is to determine the direction difference 664 between a first road layer and a second road layer of a multi-layer road structure. The direction difference 664 is used to determine whether the two road layers are going in a general same direction 650 or in different directions 653. The direction determination module 612 can provide z-axis or the altitude information 662 by using the altitude position estimation module 616.

The purpose of the speed differential module 614 is to calculate the difference speed 660 between the first average speed 656 of a vehicle and the second average speed 658 of the vehicle. The difference speed 660 can be used to determine road layer information.

The purpose of the flag module 610 is to set a flag 670 identifying when the first device 102 of the navigation system 100 is on the multi-layer road structure 202. For example, the flag module 610 is set to a flag true 672 or "1" when the navigation system 100 is on the multi-layer road structure 202. The value of the flag module 610 is set to a flag false 674 or "0" when the navigation system 100 is not on the multi-layer road structure 202.

Figure 7:
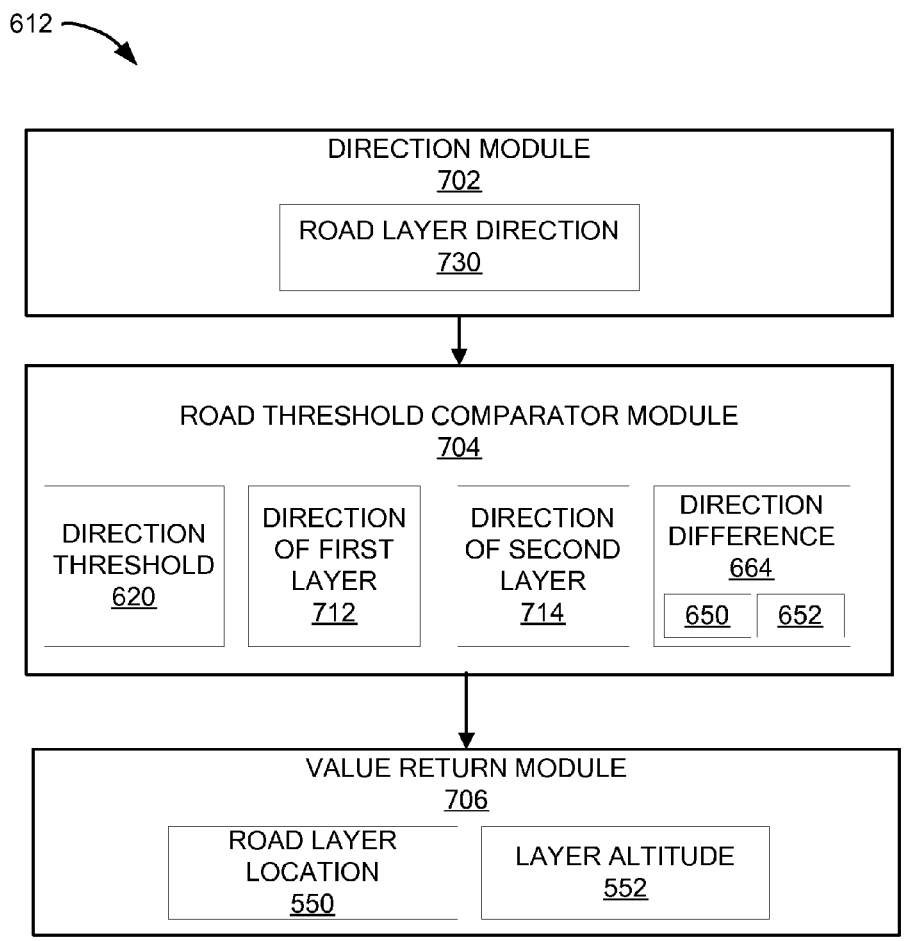
FIG. 7 shows a control flow of the direction determination module of the navigation system.

Referring now to FIG. 7, therein is shown a control flow of the direction determination module 612 in FIG. 6. FIG. 7 depicts the control flow when the flag module 610 in FIG. 6 returns the flag true 672. In other words, the flag module 610 in FIG. 6 in the matching module 506 of FIG. 5 returns a value indicating the first device 102 of the navigation system 100 is located in the multi-layer road structure 202.

The direction determination module 612 in FIG. 7 can include a direction module 702, a road threshold comparator module 704, and a value return module 706. The direction module 702 can be coupled to the road threshold comparator module 704, which can be coupled to the value return module 706.

The purpose of the direction module 702 is to determine a road layer direction 730. The purpose of the road threshold comparator module 704 is to calculate a direction difference 716 between a direction of a first layer 712 and a direction of a second layer 714. The direction threshold 620 is then subtracted from, or compared with, the direction difference 716. When the direction difference 716 is less than the value of the direction threshold 620, the first device 102 of the navigation system 100 is on a multi-layer road with two layers running in a same direction 762.

When the direction difference 716 produces a value larger than or equal to the direction threshold 620 (Δroad), the road threshold comparator module 704 can indicate that the first device 102 of the navigation system 100 is on a multi-layer road with two layers running in the different directions 653. Based on the direction at which the first device 102 is moving and the direction of the road, it determines the road layer location 550 of the first device 102. When the direction of two layers of the multi-layer road structure 202 are going in the different directions 653, the direction difference 664 can determine the road layer location 550 and the device altitude 552 of the first device 102 of the navigation system 100. The road layer location 550 and the device altitude 552 can be stored in the value return module 706.

When the road layer location 550 of the first device 102 of the navigation system 100 is determined, the road layer location 550 is used to perform the attribute look-up 526 in the map database module 510 to determine if the road altitude 530 and other map attributes of a specific road layer are available. When the map attributes 518 are available, the value return module 706 returns information, such as the road layer location 550 and the device altitude 552.

Figure 8:
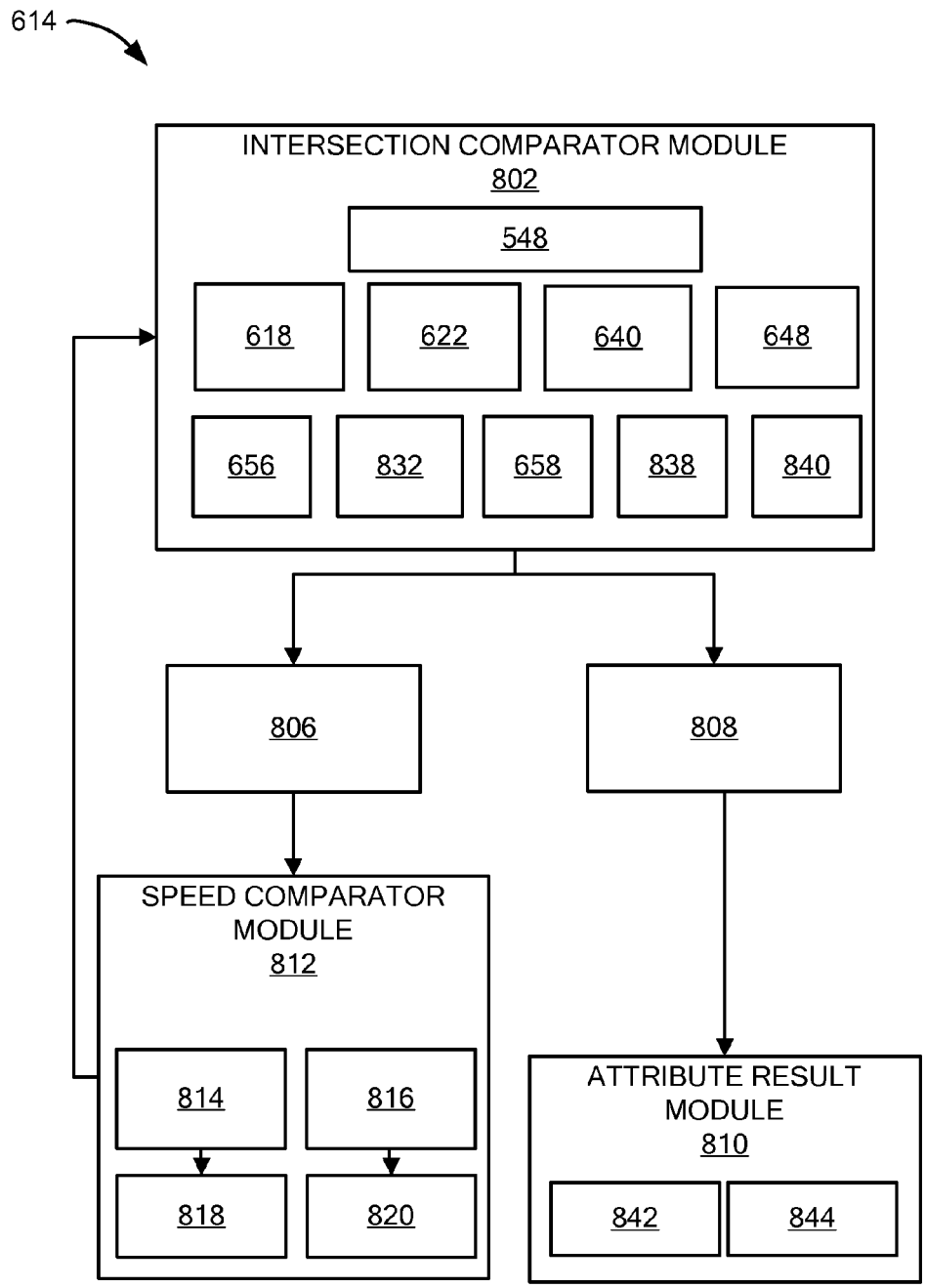
FIG. 8 shows a control flow of the speed differential module of the navigation system.

Referring now to FIG. 8, therein is shown a control flow of the speed differential module 614 of the navigation system 100. FIG. 8 depicts an embodiment where an upper and a lower layer road of a multi-layer road system are going in the same direction or generally in the same direction. This embodiment can be extended to any two layers of a road structure with multiple layers.

An intersection comparator module 802 can be coupled to a below threshold module 806, which can be coupled to a speed comparator module 812. The speed comparator module 812 can be coupled back to the intersection comparator module 802. The intersection comparator module 802 can also be coupled to an above threshold module 808, which can be coupled to an attribute result module 810.

The speed comparator module 812 includes a speed threshold-under validation module 814 and a speed threshold-over validation module 816. The speed threshold-under validation module 814 can be coupled to an up incrementer module 818. The speed threshold-over validation module 816 can be coupled to low incrementer module 820.

The purpose of the speed comparator module 812 is to calculate the difference between the first average speed 656 outside the intersection location 640 and the second average speed 658 at the intersection location 640. The speed comparator module 812 then determines if the difference speed 660 is less than or equal to the speed change threshold 618.

The purpose of the intersection comparator module 802 is to determine the number of intersections 832 at which little or no speed decrease is detected using an up counter 838. The first device 102 of the navigation system 100 is initially set to be on a road with intersections, such as a typical surface road in a big city. Upper can have an initial value of "zero." The up counter 838 counts the number of intersections at which little or no speed decrease is detected. While the up counter 838 is less than or equal to the intersection threshold 622, the below threshold module 806 executes the speed comparator module 812.

When the difference in a speed 548 is less than or equal to the speed change threshold 618, the speed threshold-under validation module 814 is executed. The speed change threshold 618 can be determined from empirical data at the location, real-time traffic flow information, information provided by a user, or a road attribute such as speed limit. The speed change threshold 618 can be modified when a road attribute or traffic condition changes. When the difference in the speed 548 is less than or equal to the speed change threshold 618, the up incrementer module 818 is executed. Upper is incremented by "1" until it is great than the intersection threshold 622.

Normally, the multi-layer road structure 202 is constructed in bigger cities with traffic congestion issues. In the multi-layer road structure 202, one of the road layers can be a road with intersections 844 while another road layer can be a high speed road 842 with no or few intersections. At a particular location of the location coordinates 542, the map database module 510 can indicate that it is the intersection location 640. The first device 102 at the location coordinates 542 can be located on the road with intersections 844 or on the high speed road 842. The speed differential module 614 is based on empirical studies where speed changes occur near road intersection regions in most situations. Road layers with fewer or no intersections have little or no speed changes between outside an intersection location and at an intersection location. If the difference between the average speed outside an intersection location and the speed at an intersection location is less than or equal to the speed change threshold 618, it means that the speed of the first device 102 of the navigation system 100 through the intersection location has not decreased or has not decreased by more than the speed change threshold 618.

With little or no speed change detected, there is a higher probability that the first device 102 of the navigation system 100 is located on the high speed road 842, with no or fewer intersections at that road layer. The counter upper is incremented until it is greater than or equal to the intersection threshold 622. When upper is greater than or equal to the intersection threshold 622, the navigation system 100 is on the high speed road 842. Otherwise, the attribute result module 810 returns a value, indicating that the first device 102 of the navigation system 100 can be located on the road with intersections 844, such as surface road with traffic lights. There is a possibility of a traffic jam or traffic accident in a high speed road, but most of the time, there is not a significant speed decrease on a high speed road at a location where an intersection is indicated on one of the road layers in the map database module 510.

While the up counter 838 is less than or equal to the intersection threshold 622, and while the difference speed 660 is larger than the speed change threshold 618, the speed threshold-over validation module 816 is executed. The speed of a vehicle at the current location 522, where an intersection is indicated in the map database module 510, has decreased. There is a higher possibility that the first device 102 of the navigation system 100 is at an intersection and is located on a road layer with intersections, such as a typical surface road.

When the difference in the speed 548 of the first device 102 slows down at an intersection location by an amount larger than the speed change threshold 618, counter upper can be decreased by "1". Also, a low counter 840 can be incremented by "1" by the low incrementer module 820. The low counter 840 is a counter to track when there is a speed decrease larger than the speed change threshold 618. The condition for the first device 102 of the navigation system 100 to be on the high speed layer of the dual road (or a layer of road without traffic lights) has not yet occurred. The coupling between the intersection comparator module 802 and the speed comparator module 812 can be implemented as a "while" loop.

When the speed threshold-over validation module 816 determines that the difference speed 660 is greater than the speed change threshold 618, it means the navigation system is located at a layer with the road with intersections 844. For example, when two roads are in the same direction, a vehicle comes to a stop or decreases its speed by more than 10 miles per hour, it increases the probability that there is an intersection on the road. The low counter 840 is decremented by the low incrementer module 820. When the navigation system 100 is on the surface road, there are usually a number of intersections and traffic lights. There is a higher probability that there are more speed decreases at the intersection location 640 on the road.

When the intersection comparator module 802 determines that the up counter 838 is greater than the intersection threshold 622, there is a higher probability that the navigation system 100 is located on the high speed road 842, with fewer or no intersections. The above threshold module 808 is executed. It determines a road attribute such as layer location and height position. The attribute result module 810 will return a road attribute information, including whether the first device 102 is on the high speed road 842 or on the road with intersections 844.

The modules in FIGS. 5, 6, 7 and 8 can be shown in pseudo code format as the following pseudo code in Table 1:

```
// (1) The pseudo-code below is the core algorithm for device z-axis
position judgment.
// More intelligent method can be extended based on this core to
filter out the noise in reality.
// (2) If z-axis data is existed in map data, the invention can provide
z-axis data.
// otherwise, this algorithm return TRUE (at surface road), and
FALSE (on the upper layer road).
Constant 1: Speed change threshold at intersection- ΔSpeed
Constant 2: Dual-layer roads direction angle threshold - ΔRoad
Constant 3: Number of intersection under monitoring - N_intersection
Read_System_Speed ( );
iLoc = Read_System_Location_at_Map( )
If (Map_DB(iLoc) == dual-layer_road) THEN
        dual-layer_flag = TRUE;
ELSE    return (TRUE, z-axis_from_Map_DB(iLoc)); // not stay
        dual-layer road
// Dual-layer road are not layout in the same direction, i.e, the road angle
existed (Scenario 2)
IF (dual-layer_flag AND Nav_Matching(iLoc) >= ΔRoad) THEN
  return (FALSE, z-axis_from_Map_DB(iLoc)); // i.e., it stays at the
  upper-layer road
// Dual-layer road are layout at the same direction (Scenario 1)
int upper =lower=0;
while ( upper <= N_intersection || lower <= N_intersection) {
  if (average_speed – Speed_at_intersection <= ΔSpeed) THEN
      { upper ++; lower --;}
  ELSE
      {upper --; lower ++ ; }
}
If (upper > lower) THEN
    return (FALSE, z-axis_from_Map_DB(iLoc)); //i.e., on the
    upper layer
ELSE
    return (TRUE, z-axis_from_Map_DB(iLoc)); //i.e., on the
    surface road
```

Table 2 maps between the pseudo code and specific elements:

| Pseudo Code Parameters | Specification Elements |
| --- | --- |
| ΔSpeed | Speed change threshold 618 |
| ΔRoad | Direction threshold 620 |
| iLoc | Locator module 604 |
| N_intersection | Intersection threshold 622 |
| Dual_layer flag | Flag 670 in Flag module 610 |
| Nav_matching(iLoc) | Function performed by matching module 506 |
| z-axis_from_Map_DB | Road altitude 530 |
| Upper | Up counter 838 in intersection comparator module 802 |
| Lower | Low counter 840 in intersection comparator module 802 |
| Read_System_Speed ( ) | Function performed by speed module 504 |
| Read_System_Location_at_Map( ) | Function performed by location module 502 |

Figure 9:
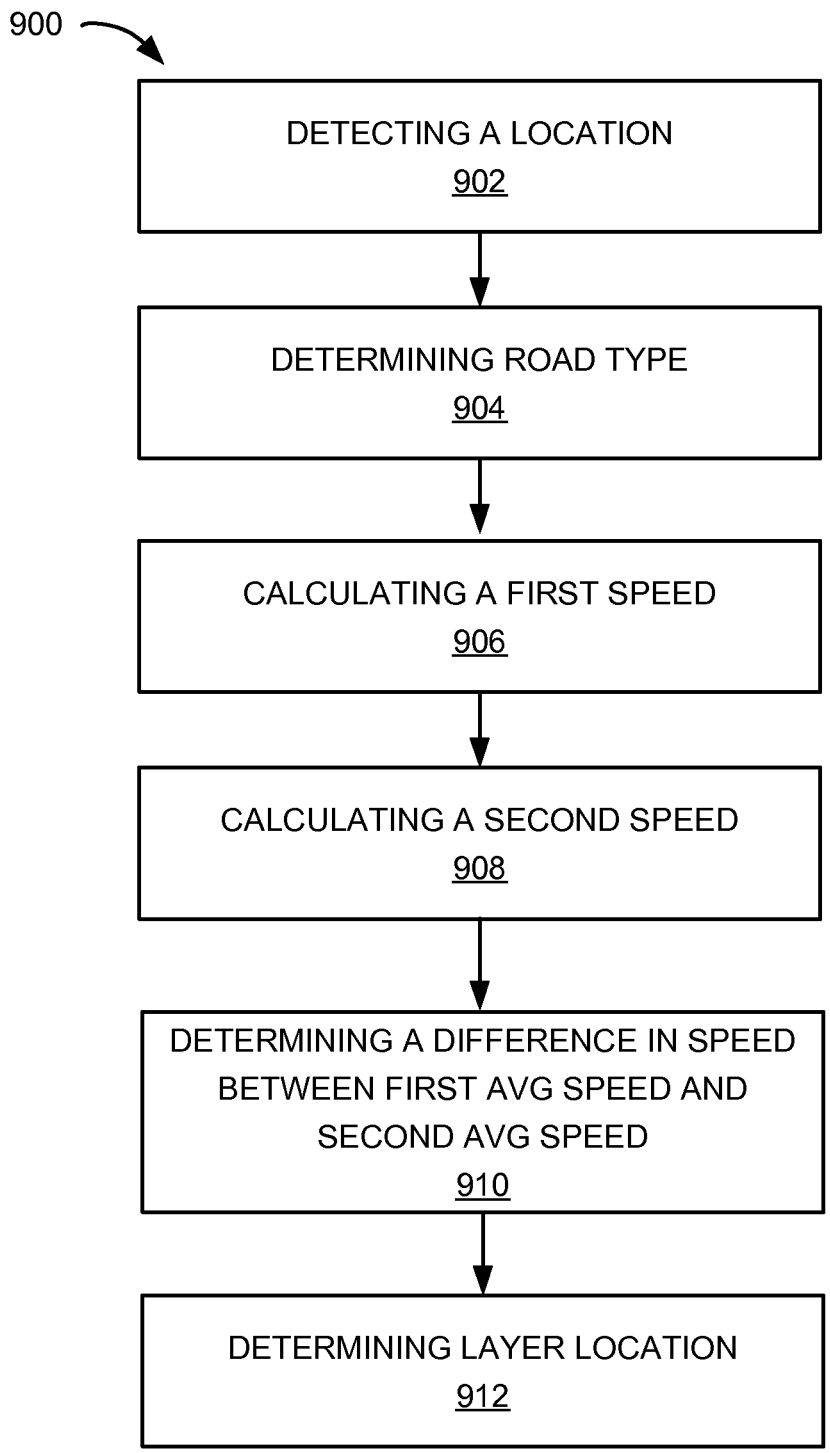
FIG. 9 shows a flow chart of a method of operation of the navigation system in a further embodiment of the present invention.

Referring now to FIG. 9, therein is shown a flow chart of a method 900 of operation of the navigation system 100 in a further embodiment of the present invention. The method 900 includes: detecting a current location for locating a vehicle in a block 902; determining a road type as multi-layered at the current location for identifying a multi-layer road structure in a block 904; calculating a first average speed outside an intersection location in a block 906; calculating a second average speed at an intersection location in a block 908; determining a difference speed between the first average speed and the second average speed in a block 910; and determining a road layer location from the difference in speed for locating the vehicle along the multi-layer road structure and displaying on a device in a block 912.

It has been discovered that by determining traffic flow information such as a change in speed, the road layer location of a navigation system at the multi-layer road structure 202 can be determined without the use of specialized or additional hardware. With only x-y location, it can be difficult to provide navigation information when it is located on a multi-layer road structure. With road layer location of a navigation system, more accurate navigation assistance can be provided. Different road layers can have different attributes. With road layer location, the navigation system can provide other road attributes, including direction of traffic flow, x-y location, number of traffic lights, speed cameras, stop signs, number of intersections, and altitude for that road layer.

It can be implemented in commercially available mobile devices, such as cell phones, laptop computers, and handheld computing devices. It can also be implemented without requiring user intervention, additional hardware, and additional modules. Specialized and additional hardware, such as a gravity sensor, can be unavailable or expensive, and it can be difficult to find in mobile devices. Thus, it has been discovered that the navigation system of the present invention furnishes important and heretofore unknown and unavailable solutions, capabilities, and functional aspects for location determination in a multi-layer road structure.

The physical transformation of map attributes from a map database and the longitudinal and latitude information of the current location of a vehicle results in providing more accurate navigation assistance, including z-axis information of the vehicle. As more accurate z-axis information in the physical world occurs, the navigational device can provide more accurate direction or routing information to the vehicle in getting to a destination.

The navigation system 100 describes the module functions or order as an example. The modules can be partitioned differently. For example, the speed module 504 in FIG. 5 can be integrated into the matching module 506 in FIG. 5 or vice versa. The invention can be implemented in software, hardware or firmware. Each of the modules can operate individually and independently of the other modules.

The resulting method, process, apparatus, device, product, and/or system is straightforward, cost-effective, uncomplicated, highly versatile and effective, can be surprisingly and unobviously implemented by adapting known technologies, and are thus readily suited for efficiently and economically manufacturing navigation systems.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   detecting a current location for a vehicle;
   determining a road type as multi-layered at the current location;
   calculating a first average speed for the vehicle outside an intersection associated with the road type;
   calculating a second average speed for the vehicle at the intersection associated with the road type;
   determining a speed difference between the first average speed and the second average speed;
   determining, with a control unit, a road layer location from the speed difference for the vehicle traversing along a multi-layer road structure; and
   communicating, with a communication unit, the road layer location for communicating with a user through a device.

2. The method as claimed in claim 1 further comprising:
   determining a device altitude from the road layer location, the device altitude representing an altitude for the vehicle traversing along the multi-layer road structure for communicating the device altitude to the user.

3. The method as claimed in claim 1 further comprising:
   determining a speed change threshold before detecting the current location; and
   wherein determining the road layer location includes:
   determining the road layer location based on comparing the speed difference with the speed change threshold for the multi-layer road structure based on real-time traffic information for the multi-layer road structure.

4. A method of operation of a navigation system comprising:
   detecting a current location for a vehicle;
   determining a road type as multi-layered at the current location;
   calculating a first average speed for the vehicle outside an intersection associated with the road type;
   calculating a second average speed for the vehicle at the intersection associated with the road type;
   determining a speed difference between the first average speed and the second average speed;
   determining a road direction for a first road layer and the road direction for a second road layer for a multi-layer road structure;
   calculating a direction difference angle between the road direction for the first road layer and the road direction for the second road layer;
   determining, with a control unit, a road layer location from the direction difference angle and a travel direction corresponding to the vehicle traversing along the multi-layer road structure; and
   communicating, with a communication unit, the road layer location for communicating with a user through a device.

5. The method as claimed in claim 4 wherein:
   determining the road layer location includes determining information regarding an altitude for the vehicle traversing along the multi-layer road structure; and
   further comprising:
   comparing the direction difference angle with a direction threshold for the multi-layer road structure.

6. The method as claimed in claim 4 wherein:
   determining the road layer location includes determining the road layer location based on comparing the direction difference angle with a direction threshold for the multi-layer road structure, the direction threshold is a constant value.

7. The method as claimed in claim 4 wherein determining the road layer location includes:
   determining the road layer location based on comparing the speed difference between the first average speed and the second average speed with a speed change threshold.

8. A navigation system comprising:
   a control unit configured to:
   detect a current location for a vehicle;
   determine a road type as multi-layered at the current location;
   calculate a first average speed for the vehicle outside an intersection associated with the road type and a second average speed for the vehicle at the intersection associated with the road type;
   determine a speed difference between the first average speed and the second average speed;
   determine a road layer location from the speed difference for the vehicle traversing along a multi-layer road structure; and
   a communication unit, coupled to the control unit, configured to communicate the road layer location for communicating with a user through a device.

9. The system as claimed in claim 8 wherein the control unit is further configured to:
   determine a device altitude from the road layer location, the device altitude representing an altitude for the vehicle traversing along the multi-layer road structure for communicating the device altitude to the user.

10. The system as claimed in claim 8 wherein the control unit is configured to:
    determine a speed change threshold before detecting the current location; and
    determine the road layer location based on comparing the speed difference with the speed change threshold based on real-time traffic information for the multi-layer road structure.

11. The system as claimed in claim 8 wherein the control unit is further configured to:
    determine a road direction for a first road layer and the road direction for a second road layer for the multi-layer road structure;
    calculate a direction difference angle between the road direction for the first road layer and the road direction for the second road layer; and
    determine the road layer location from the direction difference angle and a travel direction corresponding to the vehicle traversing along the multi-layer road structure.

12. The system as claimed in claim 11 wherein the control unit is configured to:
    determine information regarding an altitude for the vehicle traversing along the multi-layer road structure; and
    compare the direction difference angle with a direction threshold, the direction threshold is a constant value.

13. The system as claimed in claim 11 wherein the control unit is configured to:
    determine the road layer location based on comparing the direction difference angle with a direction threshold, wherein the direction threshold is a constant value based on empirical data for the multi-layer road structure.

14. The system as claimed in claim 11 wherein the control unit is further configured to:

determine the road layer location based on comparing the speed difference between the first average speed and the second average speed with a speed change threshold.

\* \* \* \* \*